United States Patent
Xu et al.

(10) Patent No.: US 12,531,999 B2
(45) Date of Patent: Jan. 20, 2026

(54) INTRA PREDICTION METHOD AND DECODER

(71) Applicant: GUANGDONG OPPO MOBILE TELECOMMUNICATIONS CORP., LTD., Guangdong (CN)

(72) Inventors: Luhang Xu, Guangdong (CN); Zhihuang Xie, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/617,004

(22) Filed: Mar. 26, 2024

(65) Prior Publication Data

US 2024/0236336 A1    Jul. 11, 2024

Related U.S. Application Data

(63) Continuation of application No. PCT/CN2021/122338, filed on Sep. 30, 2021.

(51) Int. Cl.
  H04N 19/159    (2014.01)
  H04N 19/176    (2014.01)

(52) U.S. Cl.
  CPC ......... *H04N 19/159* (2014.11); *H04N 19/176* (2014.11)

(58) Field of Classification Search
  CPC .......................... H04N 19/159; H04N 19/176
  See application file for complete search history.

(56) References Cited

U.S. PATENT DOCUMENTS 12,166,984 B2 * 12/2024  Zhang ................ H04N 19/159
12,219,138 B2 *  2/2025  Zhang ................ H04N 19/122
(Continued)

FOREIGN PATENT DOCUMENTS

CA    3177794     *  5/2021
CN    103548355 A  *  1/2014    ......... H04N 19/137
(Continued)

OTHER PUBLICATIONS

Sato, Kazushi translation of CN 103548355 A May 11, 2012 (Year: 2012).*

(Continued)

*Primary Examiner* — Zaihan Jiang
(74) *Attorney, Agent, or Firm* — Hodgson Russ LLP

(57) ABSTRACT

An intra prediction method and a decoder are provided. The method includes the following. A prediction mode parameter is obtained, where the prediction mode parameter indicates that an intra prediction value is to be determined in a derivation manner. At least two prediction modes are determined according to the derivation manner. A first weight combination related to the at least two prediction modes is determined. A first cost for performing prediction on a template region of a current block in the at least two prediction modes is determined according to the at least two prediction modes and the first weight combination. A second cost for performing prediction on the template region in a first prediction mode is determined according to the first prediction mode. An intra prediction value of the current block is determined according to the first cost and the second cost.

20 Claims, 9 Drawing Sheets

(56) References Cited

U.S. PATENT DOCUMENTS

| | | | | |
|---|---|---|---|---|
| 2011/0243225 A1* | 10/2011 | Min | ............... | H04N 19/122 |
| | | | | 375/E7.243 |
| 2017/0374369 A1 | 12/2017 | Chuang et al. | | |
| 2022/0329800 A1* | 10/2022 | Ray | ............... | H04N 19/176 |
| 2023/0073917 A1* | 3/2023 | Chen | ............... | H04N 19/119 |
| 2023/0079960 A1* | 3/2023 | Chen | ............... | H04N 19/176 |
| | | | | 375/240.02 |
| 2024/0137541 A1* | 4/2024 | Zhao | ............... | H04N 19/132 |

FOREIGN PATENT DOCUMENTS

| | | | |
|---|---|---|---|
| CN | 104768002 | | 7/2015 |
| CN | 104954788 | | 9/2015 |
| CN | 110166775 | | 8/2019 |
| WO | WO-2018054269 | * | 9/2017 |
| WO | 2022256825 | | 12/2022 |

OTHER PUBLICATIONS

WIPO, International Search Report and Written Opinion for International Application No. PCT/CN2021/122338, Jul. 5, 2022.

Xiu et al., "Decoder-side Intra Mode Derivation for Block-based Video Coding," 2016 Picture Coding Symposium (PCS), 2016.

Zhao et al., "EE2 Related—DIMD with implicitly derived multiple blending modes," Joint Video Experts Team (JVET) of ITU-T SG 16 WP 3 and ISO/IEC JTC 1/SC 29, document: JVET-W0126, Jul. 2021.

Coban et al., "Algorithm description of Enhanced Compression Model 2 (ECM 2)," Joint Video Experts Team (JVET) of ITU-T SG 16 WP 3 and ISO/IEC JTC 1/SC 29, document: JVET-W2025, Jul. 2021.

EPO, Extended European Search Report for EP Application No. 21958942.1, Jun. 24, 2025.

* cited by examiner

300

```
┌─────────────────────────────────────────────────────────────────┐
│  OBTAIN PREDICTION MODE PARAMETER, WHERE PREDICTION MODE        │
│  PARAMETER INDICATES THAT INTRA PREDICTION VALUE IS TO BE       │──310
│            DETERMINED IN DERIVATION MANNER                      │
└─────────────────────────────────────────────────────────────────┘
                                │
┌─────────────────────────────────────────────────────────────────┐
│  DETERMINE AT LEAST TWO PREDICTION MODES ACCORDING TO DERIVATION│──320
│                            MANNER                               │
└─────────────────────────────────────────────────────────────────┘
                                │
┌─────────────────────────────────────────────────────────────────┐
│   DETERMINE FIRST WEIGHT COMBINATION RELATED TO AT LEAST TWO    │──330
│                       PREDICTION MODES                          │
└─────────────────────────────────────────────────────────────────┘
                                │
┌─────────────────────────────────────────────────────────────────┐
│  DETERMINE, ACCORDING TO AT LEAST TWO PREDICTION MODES AND FIRST│
│  WEIGHT COMBINATION, FIRST COST FOR PERFORMING PREDICTION ON    │──340
│  TEMPLATE REGION OF CURRENT BLOCK IN AT LEAST TWO PREDICTION    │
│                            MODES                                │
└─────────────────────────────────────────────────────────────────┘
                                │
┌─────────────────────────────────────────────────────────────────┐
│  DETERMINE, ACCORDING TO FIRST PREDICTION MODE, SECOND COST FOR │──350
│ PERFORMING PREDICTION ON TEMPLATE REGION IN FIRST PREDICTION MODE│
└─────────────────────────────────────────────────────────────────┘
                                │
┌─────────────────────────────────────────────────────────────────┐
│   DETERMINE INTRA PREDICTION VALUE OF CURRENT BLOCK ACCORDING TO│──360
│                  FIRST COST AND SECOND COST                     │
└─────────────────────────────────────────────────────────────────┘
```

- DETERMINE AT LEAST TWO PREDICTION MODES WHEN INTRA PREDICTION VALUE IS DETERMINED IN DERIVATION MANNER — 410
- DETERMINE FIRST WEIGHT COMBINATION RELATED TO AT LEAST TWO PREDICTION MODES — 420
- DETERMINE, ACCORDING TO AT LEAST TWO PREDICTION MODES AND FIRST WEIGHT COMBINATION, FIRST COST FOR PERFORMING PREDICTION ON TEMPLATE REGION OF CURRENT BLOCK IN AT LEAST TWO PREDICTION MODES — 430
- DETERMINE, ACCORDING TO FIRST PREDICTION MODE, SECOND COST FOR PERFORMING PREDICTION ON TEMPLATE REGION IN FIRST PREDICTION MODE — 440
- DETERMINE INTRA PREDICTION VALUE OF CURRENT BLOCK ACCORDING TO FIRST COST AND SECOND COST — 450
- SIGNAL PREDICTION MODE PARAMETER IN BITSTREAM, WHERE PREDICTION MODE PARAMETER INDICATES THAT INTRA PREDICTION VALUE IS TO BE DETERMINED IN DERIVATION MANNER — 460

FIG. 7

INTRA PREDICTION METHOD AND DECODER

CROSS REFERENCE TO RELATED APPLICATION(S)

This application is a continuation of International Application No. PCT/CN2021/122338, filed Sep. 30, 2021, the entire disclosure of which is incorporated herein by reference.

TECHNICAL FIELD

This disclosure relates to the field of video coding, and in particularly to an intra prediction method and a decoder.

BACKGROUND

Digital video compression technology mainly involves compressing a huge amount of digital picture video data, so as to facilitate transmission, storage, or the like. With the surge of internet video and higher requirements for video clarity, although a lot of video data can be saved with existing digital video compression standards, at present, there is still a need for better digital video compression technology to reduce the burden on bandwidth and traffic of digital video transmission.

Currently, a joint video exploration team (JVET) has proposed a next-generation video coding standard H.266/ versatile video coding (VVC). How to further improve the performance of video coding is an urgent problem to be solved.

SUMMARY

In a first aspect, an intra prediction method is provided. The method is applicable to a decoder and includes the following. A prediction mode parameter is obtained, where the prediction mode parameter indicates that an intra prediction value is to be determined in a derivation manner. At least two prediction modes are determined according to the derivation manner. A first weight combination related to the at least two prediction modes is determined. A first cost for performing prediction on a template region of a current block in the at least two prediction modes is determined according to the at least two prediction modes and the first weight combination. A second cost for performing prediction on the template region in a first prediction mode is determined according to the first prediction mode. An intra prediction value of the current block is determined according to the first cost and the second cost.

In a second aspect, an intra prediction method is provided. The method is applicable to an encoder and includes the following. At least two prediction modes are determined when an intra prediction value is determined in a derivation manner. A first weight combination related to the at least two prediction modes is determined. A first cost for performing prediction on a template region of a current block in the at least two prediction modes is determined according to the at least two prediction modes and the first weight combination. A second cost for performing prediction on the template region in a first prediction mode is determined according to the first prediction mode. An intra prediction value of the current block is determined according to the first cost and the second cost. A prediction mode parameter is signalled in a bitstream, where the prediction mode parameter indicates that the intra prediction value is to be determined in the derivation manner.

In a third aspect, a decoder is provided. The decoder includes a memory configured to store computer programs and a processor configured to execute the computer programs stored in the memory to: obtain a prediction mode parameter, where the prediction mode parameter indicates that an intra prediction value is to be determined in a derivation manner, determine at least two prediction modes according to the derivation manner, determine a first weight combination related to the at least two prediction modes, determine, according to the at least two prediction modes and the first weight combination, a first cost for performing prediction on a template region of a current block in the at least two prediction modes, determine, according to a first prediction mode, a second cost for performing prediction on the template region in the first prediction mode, and determine an intra prediction value of the current block according to the first cost and the second cost.

BRIEF DESCRIPTION OF THE DRAWINGS

FIG. 6 is a schematic flowchart of an intra prediction method provided in embodiments of the present disclosure.

FIG. 7 is a schematic flowchart of another intra prediction method provided in embodiments of the present disclosure.

DETAILED DESCRIPTION

The following will describe technical solutions of embodiments of the present disclosure with reference to the accompanying drawings.

The present disclosure is applicable to the field of video coding. Firstly, an applicable coding framework in the embodiments of the present disclosure is described with reference to FIG. 1 and FIG. 2. The coding framework is a block-based hybrid coding framework adopted by a current unified video coding standard.

Figure 1:
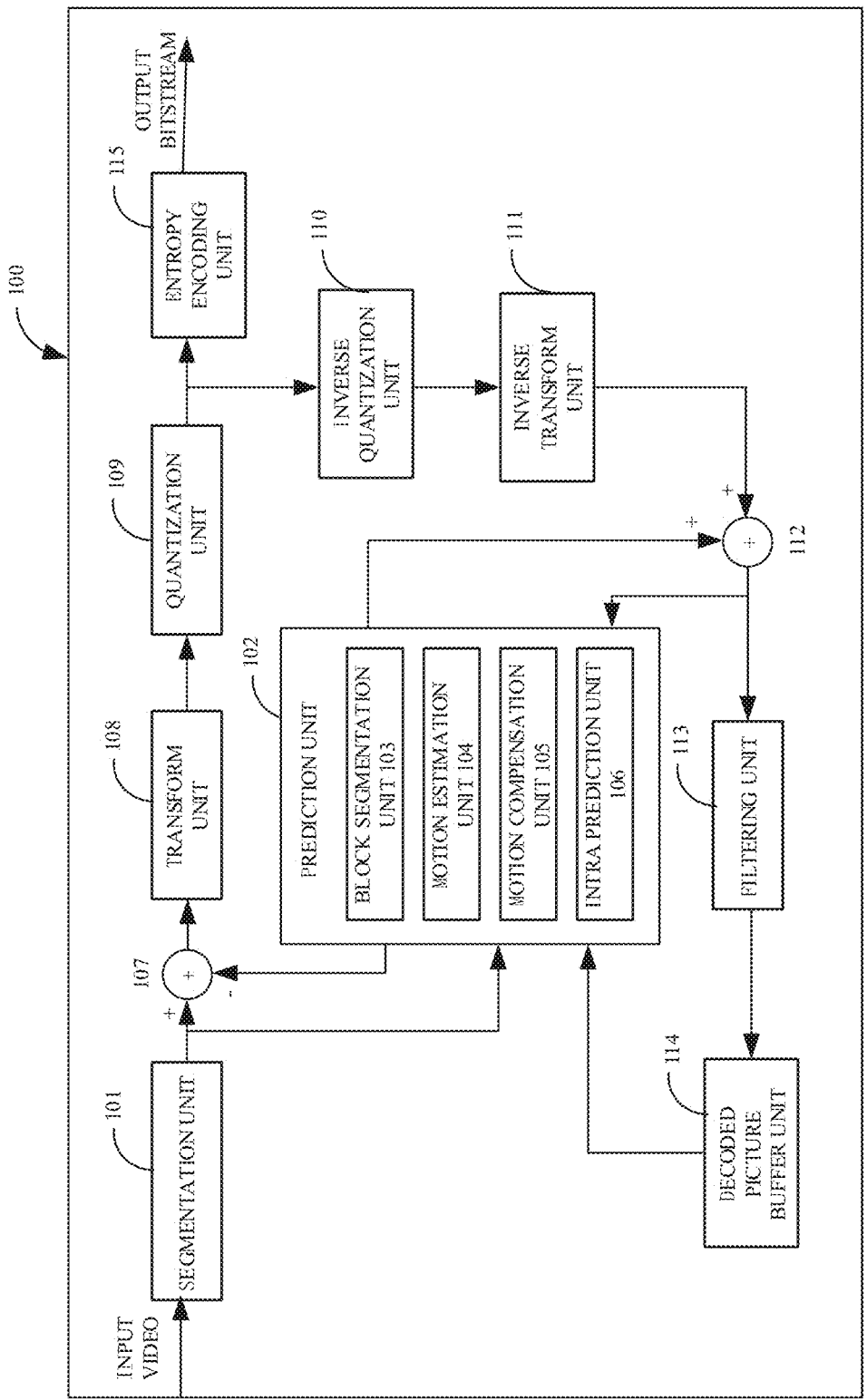
FIG. 1 is a schematic block diagram of an encoder provided in embodiments of the present disclosure.

FIG. 1 is a schematic block diagram of an encoder 100 provided in embodiments of the present disclosure. As illustrated in FIG. 1, the encoder 100 may include a segmentation unit 101, a prediction unit 102, a first adder 107, a transform unit 108, a quantization unit 109, an inverse quantization unit 110, an inverse transform unit 111, a second adder 112, a filtering unit 113, a decoded picture buffer (DPB) unit 114, and an entropy encoding unit 115.

The segmentation unit 101 divides a picture in an input video into one or more square coding tree units (CTU) or largest coding units (LCU) of the same size. Exemplarily, the CTU or the LCU may have a size of 128×128 or 64×64 samples. The segmentation unit 101 divides a picture into multiple tiles, and may further divide a tile into one or more bricks, where one tile or one brick may include one or more complete and/or partial CTUs or LCUs. Additionally, the segmentation unit 101 may form one or more slices, where one slice may include one or more tiles arranged in a raster order in the picture or one or more tiles covering a rectangular region in the picture. The segmentation unit 101 may further form one or more subpictures, where one subpicture may include one or more slices, tiles, or bricks.

In the encoder 100, the segmentation unit 101 transmits the CTU or the LCU to the prediction unit 102. In general, the prediction unit 102 may include a block segmentation unit 103, a motion estimation (ME) unit 104, a motion compensation (MC) unit 105, and an intra prediction unit 106. The ME unit 104 and the MC unit 105 may form an inter prediction unit.

Specifically, the block segmentation unit 103 may further divide an input CTU or LCT into a smaller coding unit (CU). The CU may also be divided into a prediction unit (PU) or the like, which will not be limited in the present disclosure.

The prediction unit 102 may obtain an inter prediction block of a current block (e.g., a CU, a PU, or the like) by using the ME unit 104 and the MC unit 105. The intra prediction unit 106 may obtain an intra prediction block of the current block in a derivation manner, such as template-based intra mode derivation (TIMD), decoder-side intra mode derivation (DIMD), or the like.

Since there is a strong correlation between adjacent pixels in a video picture, intra prediction is used in the video coding technology to eliminate spatial redundancy between adjacent pixels. Since there is a strong similarity between adjacent pictures in video, inter prediction is used in the video coding technology to eliminate temporal redundancy between adjacent pictures, thereby improving coding efficiency.

The prediction unit 102 outputs a prediction block of the current block. The first adder 107 calculates a difference between the current block in the output of the segmentation unit 101 and the prediction block of the current block, i.e., a residual block. The transform unit 108 reads the residual block and performs one or more transform operations on the residual block to obtain a coefficient. The quantization unit 109 quantizes the coefficient and outputs a quantized coefficient (i.e., level). The inverse quantization unit 110 scales the quantized coefficient to output a reconstructed coefficient. The inverse transform unit 111 performs one or more inverse transforms corresponding to the transforms in the transform unit 108 and outputs a residual block. The second adder 112 calculates a reconstructed block by adding the residual block and the prediction block of the current block from the prediction unit 102. The second adder 112 further sends its output to the prediction unit 102 to be used as an intra prediction reference. After all blocks in the picture are reconstructed, the filtering unit 113 performs loop filtering on a reconstructed picture.

The output of the filtering unit 113 is a decoded picture which is buffered to the DPB unit 114. The DPB unit 114 outputs the decoded picture according to timing and control information. Here, the picture stored in the DPB unit 114 may further be used as a reference for the prediction unit 102 to perform inter prediction or intra prediction. Finally, the entropy coding unit 115 signals parameters (e.g., block division information, as well as mode information or parameter information for prediction, transform, quantization, entropy coding, loop filtering, etc.) necessary for decoding the picture from the encoder 100 in a bitstream, i.e., the encoder 100 finally outputs the bitstream.

Further, the encoder 100 may include a processor and a memory storing computer programs. When the processor reads and executes the computer programs, the encoder 100 reads the input video and generates a corresponding bitstream. Additionally, the encoder 100 may be a computing device equipped with one or more chips. A unit, which is implemented as an integrated circuit on the chip, has connection and data exchange functions similar to the corresponding unit in FIG. 1.

Figure 2:
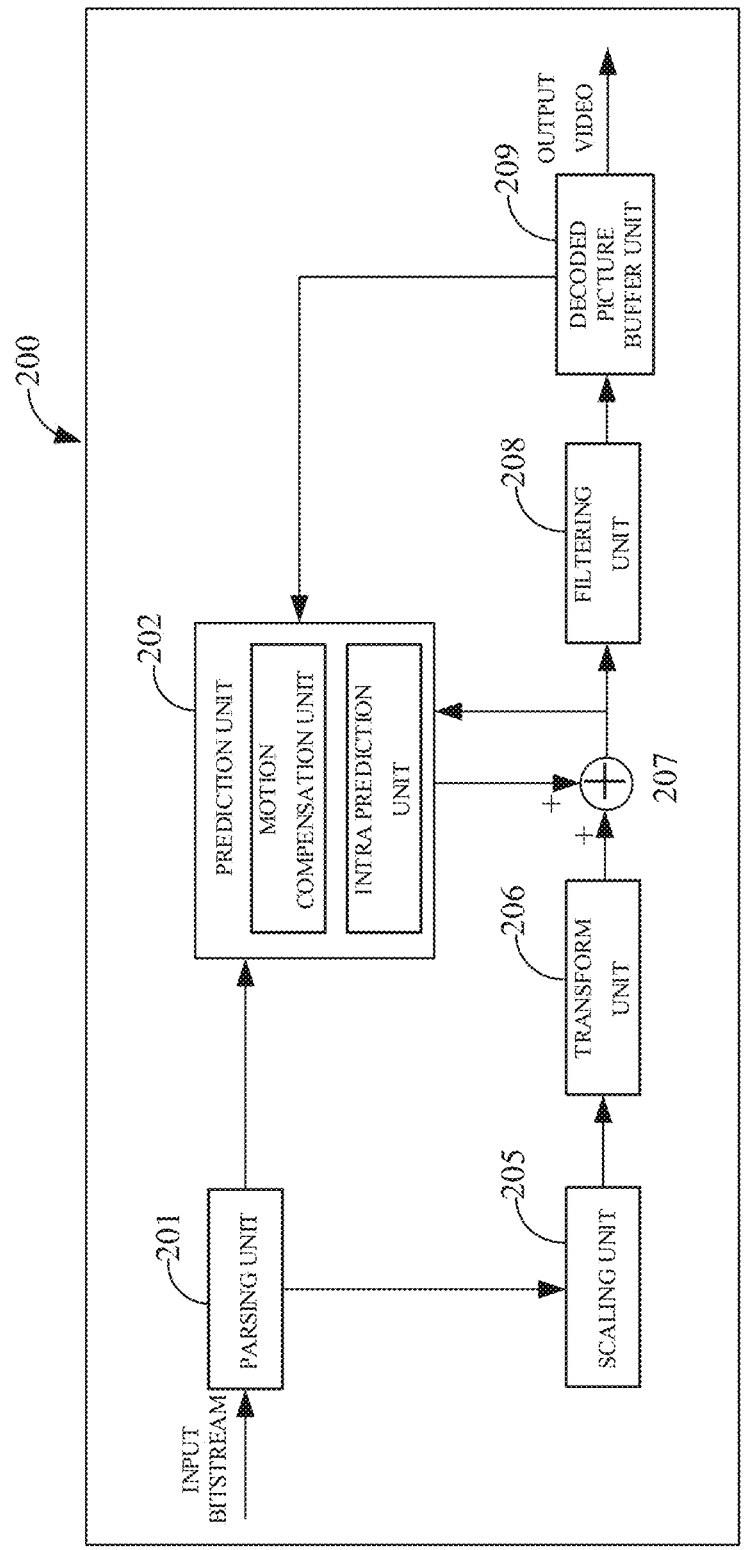
FIG. 2 is a schematic block diagram of a decoder provided in embodiments of the present disclosure.

FIG. 2 is a schematic block diagram of a decoder 200 provided in embodiments of the present disclosure. As illustrated in FIG. 2, the decoder 200 may include a parsing unit 201, a prediction unit 202, a scaling unit 205, a transform unit 206, an adder 207, a filtering unit 208, and a DPB unit 209.

An input bitstream of the decoder 200 may be a bitstream output by the encoder 100. The parsing unit 201 parses the input bitstream, for example, analyzes existing information to determine block division information, as well as mode information or parameter information for prediction, transform, quantization, entropy coding, loop filtering, etc. which are similar to such information at an encoding end, so as to ensure the reconstructed picture obtained by the encoding end is the same as the decoded picture obtained by a decoding end. The parsing unit 201 sends the obtained mode information or parameter information to a unit in the decoder 200.

The prediction unit 202 determines a prediction block of a current decoding block (e.g., a CU, a PU, or the like). Here, the prediction unit 202 may include a motion compensation unit 203 and an intra prediction unit 204. Specifically, when an inter decoding mode is indicated for decoding the current decoding block, the prediction unit 202 sends relevant parameters from the parsing unit 201 to the motion compensation unit 203 to obtain an inter prediction block. When an intra prediction mode is indicated for decoding the current decoding block, the prediction unit 202 sends the relevant parameters from the parsing unit 201 to the intra prediction unit 204 to obtain an intra prediction block.

The scaling unit 205 has the same function as the inverse quantization unit 110 in the encoder 100. The scaling unit 205 scales a quantized coefficient (i.e., level) from the parsing unit 201 to obtain a reconstructed coefficient. The transform unit 206 has the same function as the inverse transform unit 111 in the encoder 100. The transform unit 206 performs one or more transform operations (i.e., inverse operations of the one or more transform operations performed by the inverse transform unit 111 in the encoder 100) to obtain a residual block.

The adder 207 add its inputs (the prediction block from the prediction unit 202 and the residual block from the transform unit 206) to obtain a reconstructed block of the current decoding block. The reconstructed block is further sent to the prediction unit 202 to be used as a reference for other blocks encoded in the intra prediction mode.

After all blocks in a picture are reconstructed, the filtering unit 208 performs loop filtering on a reconstructed picture. Here, the output of the filtering unit 208 is a decoded picture which is buffered to the DPB unit 209. The DPB unit 209 outputs the decoded picture according to timing and control information. The picture stored in the DPB unit 209 may further be used as a reference for the prediction unit 202 to perform inter prediction or intra prediction.

Further, the decoder 200 may include a processor and a memory storing computer programs. When the processor reads and executes the computer programs, the decoder 200 reads an input bitstream and generates a corresponding decoded video. Additionally, the decoder 200 may be a computing device equipped with one or more chips. A unit, which is implemented as an integrated circuit on the chip, has connection and data exchange functions similar to the corresponding unit in FIG. 2.

It may be noted that the above describes the basic process of a video codec under a block-based hybrid coding framework in conjunction with FIG. 1 or FIG. 2. The coding framework or the basic process is only used for illustration but is not intended to limit embodiments of the present disclosure. For example, with the development of technology, some modules or steps of the framework or process may be optimized. In a specific implementation, technical solutions provided in embodiments of the present disclosure may be flexibly applied according to actual needs.

In embodiments of the present disclosure, the current block refers to a current CU, a current PU, or other coding blocks, which will not be limited in the present disclosure.

Figure 3:
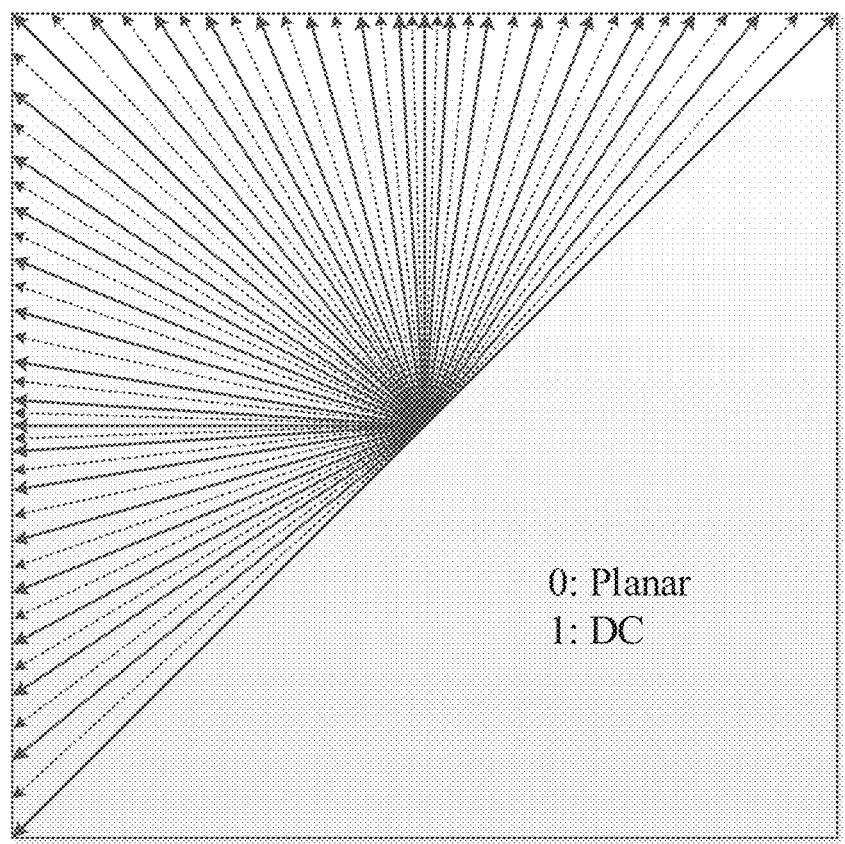
FIG. 3 is an example of an intra prediction mode for H.266/VVC.

Exemplarily, in the intra prediction unit 106 of the encoder 100 or the intra prediction unit 204 of the decoder 200, a prediction block is generally obtained by performing prediction on a current coding block in various angular modes and non-angular modes. A prediction mode of a current coding unit is selected according to rate distortion information calculated from the prediction block and an original block. The prediction mode is then transmitted to the decoding end through the bitstream. The decoding end parses out the prediction mode and performs prediction to obtain a prediction picture of the current decoding block. The prediction picture is superimposed with a residual sample transmitted through the bitstream, so as to obtain the reconstructed picture. With the development of digital video coding standards over generations, the non-angular mode remains relatively stable, and includes a mean mode and a planar mode. The number of angular modes increases continuously with the evolution of digital video coding standards. Taking international digital video coding standard H series as an example, H.264/AVC standard only includes eight angular prediction modes and one non-angular prediction mode, H.265/HEVC is extended to include 33 angular prediction modes and two non-angular prediction modes, and in H.266/VVC, the intra prediction mode includes a planar mode, a DC mode, and 65 angular modes. FIG. 3 illustrates a schematic diagram of 67 intra prediction modes in H.266/VVC.

In some embodiments, the decoder may determine the intra prediction mode used for the current block according to some flag information. To reduce overhead of these flag information in the bitstream, a most probable mode (MPM) is introduced. The decoder can derive some MPMs according to a correlation between blocks. Since MPMs are more likely to be selected, a shorter codeword can usually be used to represent a mode in the MPMs, while a longer codeword can be used to represent a non-MPM mode. The MPM usually uses a mode used for a neighboring block, e.g., a mode used for a left neighboring block or a mode used for a top neighboring block. Because of spatial correlation, the mode used for the neighboring block may also be used for the current block. In addition, there are modes related to the modes used for these neighboring blocks, such as modes with similar angles, such as subtle texture changes between the current block and neighboring blocks. Furthermore, there are the most commonly used modes, such as the planar mode.

Given the above, a DIMD method and a TIMD method are proposed.

Figure 4:
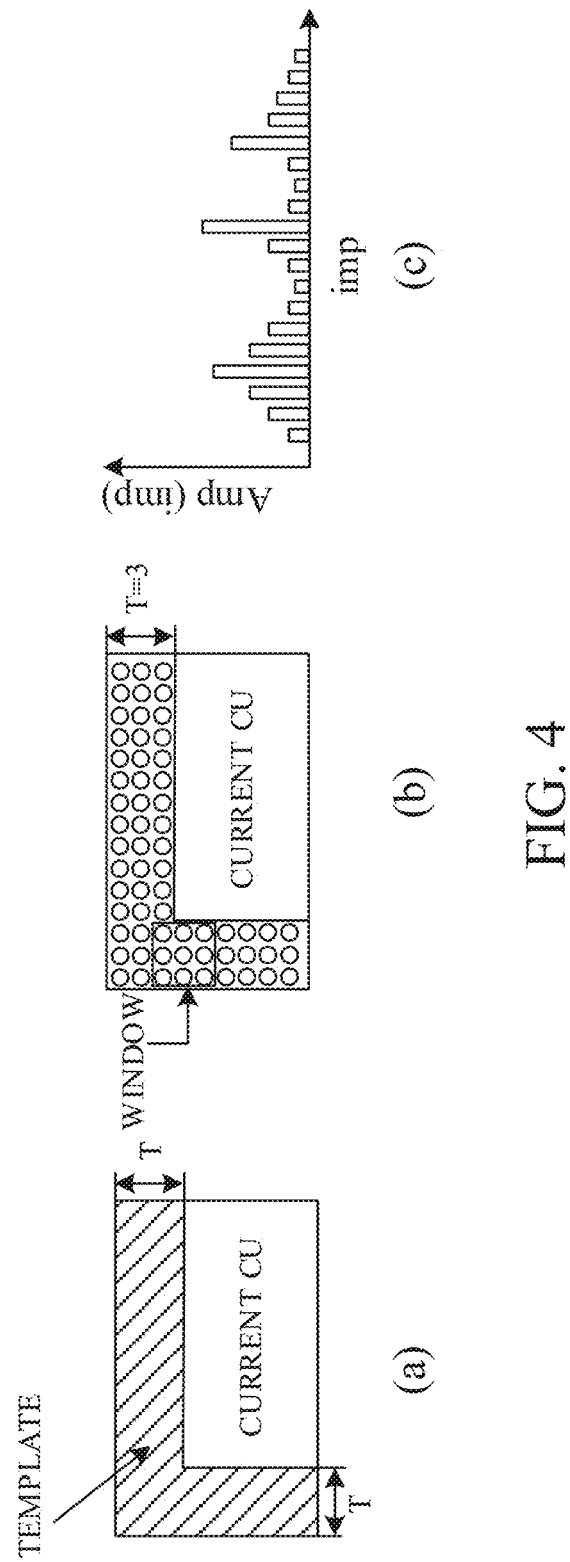
FIG. 4 is a schematic diagram of a DIMD method.

FIG. 4 illustrates a schematic diagram of the DIMD method, where graph (a) is a schematic diagram of a current block and a template, where sample values reconstructed around the current block are used as a template region. Graph (b) is an example of a process of forming an MPM list of a DIMD block. As illustrated in graph (b), a sobel operator can be used to scan the template region over each 3×3 region, calculate a gradient Dx in a horizontal direction and a gradient Dy in a vertical direction, and then calculate an amplitude value amp and an angle value angle at each position, where amp=Dx+Dy, and angle arctan (Dy/Dx). Graph. (c) is a histogram of the amplitude value and the angle value. For example, the histogram may be obtained by accumulating amplitude values of the same angular mode according to an angular prediction mode corresponding to an angle of each position in the template region. Exemplarily, a final prediction result can be obtained by weighting prediction values of the planar mode and two angular modes with the highest amplitude value and the second highest amplitude value in the histogram, or a prediction value of the planar mode may be determined as the final prediction result of the current block.

Figure 5:
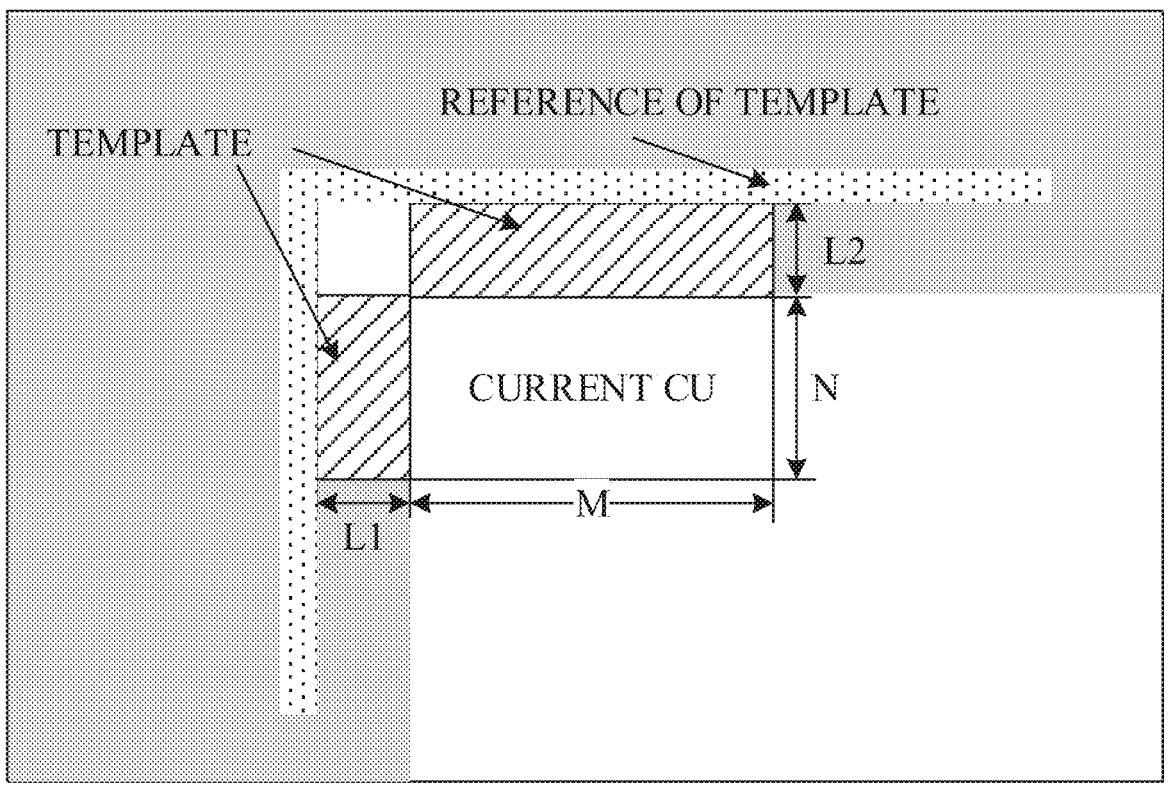
FIG. 5 is a schematic diagram of a TIMD method.

FIG. 5 illustrates a schematic diagram of a TIMD method. As illustrated in FIG. 5, an MPM list can be derived from an inter prediction mode selected by at least one neighboring block of a current block. Taking a reconstructed value at a sample of reference of the template region in FIG. 5 as a reference row, modes in the MPM list can be used to obtain prediction results of the template region respectively. As a specific implementation, the at least one neighboring block includes, for example, at least one of five blocks such as the top block, the left block, the top left block, the bottom left block, and the top right block of the current block. Here, template regions of the left block and the top block adjacent to a current CU are already decoded.

As an example, as illustrated in FIG. 5, the current CU has a size of M*N, and the template region includes a region with a size of L1*N at the left of the current CU and/or a region with a size of M*L2 at the top of the current CU. Optionally, the template region may further include at least one of a region with a size of L1*L2 at the top left of the current block, a region with a size of M*L2 at the top right of the current block, or a region with a size of L1*N at the bottom left of the current block. The number of rows of L1 or L2 herein may be a variable to be signalled in the bitstream or may be a fixed value, which will not be limited in the present disclosure. In addition, optionally, CUs of different sizes may use regions with different numbers of reference rows as template regions. For example, a larger CU may use a region with more reference rows as the template region, and a smaller CU may use a region with fewer reference rows as the template region.

Since the template region and the current CU are adjacent to each other and have a certain correlation, prediction effect of an inter prediction mode on the template region can be used to estimate the prediction effect of the inter prediction mode on the current CU. Exemplarily, a cost between the reconstructed value of the template region and the prediction result of each prediction mode may be calculated, and the final prediction result may be obtained according to a prediction mode corresponding to a minimum cost, or the final prediction result may be obtained by weighting prediction results of prediction modes corresponding to the minimum cost (denoted as cost1) and a second minimum cost (denoted as cost2).

Exemplarily, one, two, or more prediction modes may be determined for performing intra prediction on the current block. However, in current DIMD technology or TIMD technology, the prediction mode to be employed is determined through multiple attempts on empirical values. Therefore, there is an urgent need for a scheme to improve the accuracy of intra prediction.

Given the above, embodiments of the present disclosure provide an intra prediction method. A first cost for performing prediction on a template region of a current block in at least two prediction modes is determined according to the at least two prediction modes and a first weight combination of the at least two prediction modes. A second cost for performing prediction on the template region in a first prediction mode is determined. An intra prediction value of the current block is then determined according to the first cost and the second cost. In embodiments of the present disclosure, the intra prediction value of the current block can be determined according to the cost for performing prediction on the template region of the current block in the at least two prediction modes and the cost for performing prediction on the template region in the first prediction mode. For example, the intra prediction value of the current block is obtained by weighting prediction results of the at least two prediction modes, or the intra prediction value of the current block is obtained according to a prediction result of a single prediction mode (e.g., the first prediction mode). Therefore, embodiments of the present disclosure can be conducive to performing intra prediction on the current block more accurately, thereby improving compression efficiency.

Optionally, the template region of the current block includes at least part of samples in at least one row of samples at the top, the left, the top left, the bottom left, and the top right of the current block.

Exemplarily, in embodiments of the present disclosure, the template region of the current block may include neighboring reference samples of the current block. In some implementations, the template region may include one or more rows of neighboring samples at the top of the current block and/or at the left of the current block, or may include one or more rows of (neighboring or non-neighboring) samples at the top left, the bottom left, and the top right of the current block, which will not be limited in the present disclosure. As some possible implementations, samples in the template region of the current block may be determined based on index values, which will not be limited in the present disclosure.

FIG. 6 illustrates a schematic flowchart of an intra prediction method 300 provided in embodiments of the present disclosure. The method 300 may be applicable to a decoder, such as the decoder 200 in FIG. 2. Further, the method 300 may be applicable to the intra prediction unit 204 in the decoder 200. As illustrated in FIG. 6, the method 300 includes operations at 310 to 360.

At 310, a prediction mode parameter is obtained, where the prediction mode parameter indicates that an intra prediction value is to be determined in a derivation manner.

Exemplarily, the prediction mode parameter of a current block may be obtained, i.e., the prediction mode parameter indicates that an intra prediction value of the current block is to be determined in the derivation manner. In embodiments of the present disclosure, the current block may refer to a block or coding block that is currently being coded, such as a CU, a PU, or the like, which will not be limited in the present disclosure. The current block may also be replaced with "coding block", "block", "current coding block", etc., all of which may have the same or similar meaning.

Exemplarily, the derivation manner includes TIMD or DIMD, which will not be limited in the present disclosure.

In the DIMD mode, an amplitude histogram may be derived by calculating gradients (e.g., a gradient Dx in a horizontal direction and a gradient Dy in a vertical direction) in a template region of the current block, and then a final prediction mode is derived according to amplitude values of respective prediction modes on the amplitude histogram. In other words, the amplitude values are obtained according to gradients of samples in a specified region (e.g., the template region). In the TIMD mode, the final prediction mode may be derived according to a cost between a reconstructed value of the template region and a weighted value of prediction values obtained by performing prediction on the template region of the current block in a series of intra prediction modes or in multiple intra prediction modes.

Exemplarily, in embodiments of the present disclosure, the template region of the current block includes at least part of samples in several rows of samples at the top, the left, the top left, the top right, and the bottom left of the current block. For example, the template region of the current block may be the template region illustrated in FIG. 4 or FIG. 5, which will not be limited in the present disclosure.

In some embodiments, an encoder may determine whether the derivation manner is used for the current block, or determine a specific derivation manner used for the current block. Optionally, the encoder may transmit information indicating whether the derivation manner is used for the current block, i.e., the prediction mode parameter, in the bitstream. Exemplarily, the encoder may calculate a cost for using the TIMD mode (or the DIMD mode) or a cost for using another mode (e.g., one MPM mode is selected or one non-MPM mode is selected). If the cost for using the TIMD mode (or the DIMD mode) is minimal, it may be determined that for the current block, the intra prediction value of the current block is determined in the TIMD mode (or the DIMD mode). Otherwise, it may be determined that for the current block, the intra prediction value of the current block is not predicted in the TIMD mode (or DIMD mode).

In some embodiments, the decoder may determine whether the derivation manner is used for the current block, or determine the specific derivation manner used for the current block. For example, the decoder may obtain an input bitstream and obtain from the bitstream information indicating whether the TIMD mode (or the DIMD mode) is used for the current block, i.e., the prediction mode parameter. In embodiments of the present disclosure, the prediction mode parameter indicates that the TIMD mode (or the DIMD mode) is used for the current block, i.e., the intra prediction value of the current block is determined in the TIMD mode (or the DIMD mode).

Exemplarily, in embodiments of the present disclosure, a cost for a prediction mode on the template may include at least one of a sum of absolute transformed differences (SATD), a sum of absolute difference (SAD), or a sum of squared errors (SSE) between a prediction value of the prediction mode on the template and the reconstructed value of the template. For example, the cost may be obtained by weighting the SAD and the SATD.

At 320, at least two prediction modes are determined according to the derivation manner. Exemplarily, the at least two prediction modes may be determined from candidate modes.

In some optional embodiments, when the derivation manner is the TIMD, the at least two prediction modes are determined according to a cost for performing prediction on the template region in the prediction mode (e.g., the candidate mode).

As a possible implementation, a cost between the reconstructed value of the template region and the prediction value (which can also be referred to as the prediction result) obtained by performing prediction on the template region in each prediction mode in the candidate modes can be calculated. Two prediction modes corresponding to a minimum cost (denoted as cost1) and a second minimum cost (denoted as cost2) can be determined as the at least two prediction modes. Exemplarily, the mode corresponding to the minimum cost may be denoted as mode1, and the mode corresponding to the second minimum cost may be denoted as mode2.

In some optional embodiments, when the derivation manner is the DIMD, the at least two prediction modes are determined according to the amplitude value corresponding to the prediction mode on the template region, where the amplitude value is obtained according to a sample gradient at at least one position in at least one direction in the template region. Exemplarily, reference may be made to the description of FIG. 4.

As a possible implementation, the histogram may be obtained by accumulating amplitude values of the same angular mode according to an angular prediction mode corresponding to an angle of each position in the template region. A default mode and two angular modes with the highest amplitude value and the second highest amplitude value in the histogram may be determined as the at least two prediction modes. Exemplarily, the angular mode with the highest amplitude value may be notated as mode1, and the angular mode with the second highest amplitude value may be notated as mode2. Exemplarily, the default mode may be, for example, a planar mode, a DC mode, or a particular angular mode (e.g., a horizontal angular mode, a vertical angular mode, or a diagonal angular mode, etc.), which will not be limited in the present disclosure.

At 330, a first weight combination related to the at least two prediction modes is determined. Specifically, the first weight combination is weights of prediction values corresponding to the at least two prediction modes when the prediction value of the template region of the current block is determined in the at least two prediction modes. In embodiments of the present disclosure, the prediction value corresponding to the prediction mode is a prediction value obtained by performing prediction on the template region of the current block in the prediction mode, or may also be described as the prediction value obtained by performing prediction on the template region of the current block by using (or applying) the prediction mode.

Exemplarily, the first weight combination includes a weight corresponding to each of the at least two prediction modes. For example, when the at least two prediction modes include two prediction modes, weights corresponding to the two prediction modes are w and (1−w) respectively, and when the at least two prediction modes include three prediction modes, weights corresponding to the three prediction modes are w1, w2, and (1−w1−w2) respectively.

In some optional embodiments, for the TIMD method, the first weight combination of the at least two prediction modes may be determined according to the cost for performing prediction on the template region of the current block in the prediction mode.

Exemplarily, the SATD between the prediction value obtained by performing prediction on the template region of the current block in mode1 and the reconstructed value of the template region can be denoted as cost1, and the SATD between the prediction value obtained by performing prediction on the template region of the current block in mode2 and the reconstructed value of the template region can be denoted as cost2. In this case, a weight w1 of the prediction value corresponding to mode1 and a weight w2 of the prediction value corresponding to mode2 can be expressed as follows:

$$w1 = \frac{cost2}{cost1 + cost2}, w2 = \frac{cost1}{cost1 + cost2}$$

In some optional embodiments, for the DIMD method, the first weight combination of the at least two prediction modes may be determined according to the amplitude value of the prediction mode in the histogram, where the amplitude value is obtained according to the sample gradient at the at least one position in the at least one direction in the template region.

Exemplarily, an amplitude value of mode1 in the histogram may be denoted as amp1, and an amplitude value of mode2 in the histogram may be denoted as amp2. In this case, a weight w0 of the prediction value corresponding to the planar mode in the template region, a weight w1 of the prediction value corresponding to mode1 in the template region, and a weight w2 of the prediction value corresponding to mode2 in the template region can be expressed as follows.

$$w0 = \frac{1}{3}, w1 = \frac{2}{3} \times \frac{amp1}{amp1 + amp2}, w2 = \frac{2}{3} \times \frac{amp2}{amp1 + amp2}$$

In some optional embodiments, at least two costs for performing prediction on the template region of the current block in the at least two prediction modes may be determined according to at least two weight combinations in a predefined weight combination table. A weight combination corresponding to a minimum cost of the at least two costs corresponding to the at least two weight combinations may then be determined as the first weight combination. Here, the at least two weight combinations are in one-to-one correspondence with the at least two costs.

Specifically, in embodiments of the present disclosure, more weight combinations may be introduced. For example, multiple weight combinations may be predefined, and the multiple weight combinations may form a weight combination table. For to-be-weighted modes derived (i.e., the at least two prediction modes), a cost for performing prediction on the template region of the current block in the to-be-weighted mode (e.g., each mode) may be determined. Then, in costs for the to-be-weighted modes corresponding to the at least two weight combinations in the template region, a weight combination corresponding to a minimum cost may be determined as the first weight combination. For example, the weight combinations in the table can be traversed to calculate prediction results corresponding to the to-be-weighted modes in the template region, and the weight combination with the minimum cost can be selected as weights of the to-be-weighted modes.

As a specific example, for the TIMD method, assuming that mode1 and mode2 are the at least two prediction modes determined, a weight table WeightTable of N weight combinations can be formed as follows:

$$WeightTable = [w_0, w_1 \ldots w_{n-1}]$$

where $w_i$ is the weight of the prediction value corresponding to the prediction mode mode1 in the template region, $i \in [0, n-1]$. In this case, the weight of the prediction value corresponding to the prediction mode mode2 in the template region is $(1-w_i)$. In this case, $w_i$ and $(1-w_i)$ can be an example of a weight combination.

Exemplarily, the prediction value $Pred_{template}$ of the template region of the current block can be obtained by weighting the prediction values corresponding to the two prediction modes mode1 and mode2 according to the following formula (1):

$$Pred_{template} = Pred_{mode1} * w + Pred_{mode2} * (1 - w) \quad (1)$$

where w is a weight in the weight combination table WeightTable, $Pred_{mode1}$ is the prediction value obtained by performing prediction on the template region of the current block in mode1, and $Pred_{mode2}$ is the prediction value obtained by performing prediction on the template region of the current block in mode2.

Further, a cost, corresponding to w, for performing prediction on the template region of the current block in mode1 and mode2 may be determined according to the prediction values obtained by performing prediction on the template region of the current block in mode1 and mode2 and the reconstructed value of the template region. After a cost corresponding to mode1 and mode2 corresponding to each weight in the weight table WeightTable in the template region of the current block is determined, the weight w corresponding to the minimum cost may be determined as the weight of the to-be-weighted mode mode1, thereby determining the first weight combination.

Optionally, the weights can also be converted to integers. For example, w can be an integer less than $2^a$, and in this case, the weighting may be performed according to the following formula (2):

$$Pred_{template} = (Pred_{mode1} * w + Pred_{mode2} * (2^a - w) + \text{offset}) >> a \quad (2)$$

where offset is equal to $2^{a-1}$, >> is a right-shift operation. Embodiments of the present disclosure can help avoid floating-point calculation and division calculation by converting the weights to integers, thereby simplifying the calculation.

Similarly, for the DIMD method, a weighting table of N weight combinations may be formed according to a method similar to the TIMD method, and the weight combination with the minimum cost may be determined as the weight corresponding to the at least two prediction modes. Specifically, reference may be made to the description above, and some adaptations may be required, which will not be repeated here.

At 340, a first cost for performing prediction on the template region of the current block in the at least two prediction modes is determined according to the at least two prediction modes and the first weight combination.

At least two first prediction values may be obtained by performing prediction on the template region in the at least two prediction modes. A weighted result (which may also be referred to as a weighted value) may be obtained by weighting, according to the first weight combination, the at least two first prediction values. The first cost may then be determined according to the weighted result and the reconstructed value of the template region. In other words, the first cost is determined according to the reconstructed value of the template region and the weighted result obtained by weighting, according to the first weight combination, the at least two prediction values obtained by performing prediction on the template region in the at least two prediction modes.

Exemplarily, the first cost may be determined according to at least one of the commonly used cost scales, such as the SATD, the SAD, and the SSE, of the reconstructed value of the template region and the prediction values obtained by performing prediction on the template region in the at least two prediction modes. As an example, the first cost may be denoted as $cost_{blend}$.

As a specific example, for the TIMD, when the at least two prediction modes are mode1 and mode2, the weight corresponding to mode1 is w1, and the weight corresponding to mode2 is w2, the prediction value Pred obtained by performing prediction on the template region of the current block in mode1 and mode2 can be expressed as the following formula (3):

$$Pred = Pred_{mode1} \times w1 + Pred_{mode2} \times w2 \quad (3)$$

where $Pred_{mode1}$ is the prediction value obtained by performing prediction on the template region of the current block in mode1, and $Pred_{mode2}$ is the prediction value obtained by performing prediction on the template region of the current block in mode2.

As another specific example, for the DIMD, when the at least two prediction modes are mode1, mode2, and the planar mode, the weight corresponding to the planar mode is w0, the weight corresponding to mode1 is w1, and the weight corresponding to mode2 is w2, a method similar to the TIMD can be used. For example, the template region of the current block is predicted with reference of template as the reference row and mode1, mode2, and the planar mode as the prediction mode. The prediction value Pred obtained by performing prediction on the template region of the current block in mode1, mode2, and the planar mode can be expressed as the following formula (4):

$$Pred = Pred_{planar} \times w0 + Pred_{mode1} \times w1 + Pred_{mode2} \times w2 \quad (4)$$

where $Pred_{planar}$ is the prediction value obtained by performing prediction on the template region of the current block in the planar mode, $Pred_{mode1}$ is the prediction value obtained by performing prediction on the template region of the current block in mode1, and $Pred_{mode2}$ is the prediction value obtained by performing prediction on the template region of the current block in mode2.

At 350, a second cost for performing prediction on the template region in a first prediction mode is determined according to the first prediction mode. Specifically, the second cost may be determined according to the reconstructed value of the template region and the prediction value obtained by performing prediction on the template region of the current block in the first prediction mode.

Specifically, the prediction value obtained by performing prediction on the template region of the current block in the first prediction mode may be determined, and then the second cost may be determined according to the prediction value and the reconstructed value of the template region. Exemplarily, the second cost may be determined according to at least one of the commonly used cost scales, such as the SATD, the SAD, and the SSE, of the prediction value and the reconstructed value of the template.

In some optional embodiments, the first prediction mode includes the prediction mode corresponding to the minimum cost of the at least two costs for performing prediction on the template in the at least two prediction modes.

As an example, for the TIMD, the first prediction mode may be mode1.

As another example, for the DIMD, costs for performing prediction on the template region of the current block in mode1, mode2, and the planar mode may be determined respectively, and then the mode corresponding to the minimum cost may be determined as the first prediction mode. Exemplarily, the first prediction mode may be one of mode1, mode2, or the planar mode.

In some optional embodiments, the first prediction mode may include a prediction mode corresponding to a non-minimum cost of costs for performing prediction on the template in the at least two prediction modes, e.g., mode2, etc., or may be a list of N candidate intra prediction modes which is formed by the TIMD and is to be traversed. The list may be composed of the default mode as well as intra modes selected by neighboring blocks (at the top left, the top, the left, the bottom left, the top right, etc.) of the current block, which will not be limited in the present disclosure.

In some optional embodiments, the number of the first prediction mode may be one or more, which will not be limited in the present disclosure. Correspondingly, the number of the second cost is the same as the number of the first prediction mode. For example, for the DIMD, the first prediction mode may include at least one of mode1, mode2, and the planar mode, i.e., the cost for performing prediction on the template region of the current block in at least one of mode1, mode2, and the planar mode may be determined respectively as the second cost. As another example, for the TIMD, the first prediction mode may include at least one of mode1 and mode2, i.e., the cost for performing prediction on the template region of the current block in at least one of mode1 and mode2 may be determined respectively as the second cost.

Exemplarily, the second cost may be determined according to at least one of the commonly used cost scales, such as the SATD, the SAD, and the SSE, of the reconstructed value of the template region and the prediction value obtained by performing prediction on the template region of the current block in the first prediction mode. As an example, the second cost may be denoted as cost1.

In some optional embodiments, in the method 300, a third cost for performing prediction on the template region of the current block in a second prediction mode may also be determined. The third cost is determined according to the reconstructed value of the template region and the prediction value obtained by performing prediction on the template region of the current block in the second prediction mode.

In some optional embodiments, the second prediction mode includes a prediction mode corresponding to the second minimum cost of the costs for performing prediction on the template region in the at least two prediction modes.

As an example, for the TIMD, the second prediction mode may be mode2.

As another example, for the DIMD, costs for performing prediction on the template region of the current block in mode1, mode2, and the planar mode may be determined respectively, and then the mode corresponding to the second minimum cost may be determined as the second prediction mode. Exemplarily, the second prediction mode may be one of mode1, mode2, or the planar mode. In some optional embodiments, the number of the second prediction mode may be one or more, which will not be limited in the present disclosure. Correspondingly, the number of the third cost is the same as the number of the second prediction mode.

In some optional embodiments, the second prediction mode may include a prediction mode corresponding to a non-second minimum cost of the costs for performing prediction on the template region in the at least two prediction modes, which will not be limited in the present disclosure.

Exemplarily, the third cost may be determined according to at least one of the commonly used cost scales, such as the SATD, the SAD, and the SSE, of the reconstructed value of the template region and the prediction value obtained by performing prediction on the template region of the current block in the second prediction mode. As an example, the third cost may be denoted as cost2.

At 360, the intra prediction value of the current block is determined according to the first cost and the second cost.

In embodiments of the present disclosure, the intra prediction value of the current block may be specifically determined in a weighting manner or in a non-weighting manner. As an example, in the non-weighting manner, the intra prediction value of the current block is determined according to a prediction result obtained by performing prediction on the current block in a single prediction mode (for example, the first prediction mode or the second prediction mode). As an example, in the weighting manner, the intra prediction value of the current block is determined by weighting prediction results obtained by performing prediction on the current block in the at least two prediction modes. Exemplarily, when the intra prediction value of the current block is obtained in the weighting manner, weights used may be the first weight combination.

As can be seen from above, the first cost is determined according to the costs for performing prediction on the template region of the current block in the at least two prediction modes, and the second cost is determined according to the cost for performing prediction on the template region of the current block in the first prediction mode. In embodiments of the present disclosure, the intra prediction value of the current block can be determined according to both the cost for performing prediction on the template region of the current block in the at least two prediction modes and the cost for performing prediction on the template region in the first prediction mode, rather than only the cost for performing prediction on the template region in the first prediction mode. Therefore, embodiments of the present disclosure can be conducive to performing intra prediction on the current block more accurately, thereby improving compression efficiency.

There exists an intra prediction method. In this method, when $cost1*2>cost2$, a final prediction result of a current block is obtained by weighting prediction results of two prediction modes corresponding to cost1 and cost2 in the current block. Otherwise, when $cost1*2 \leq cost2$, a prediction result of a single prediction mode corresponding to cost1 in the current block is determined as the final prediction result of the current block. Compared with this solution, in embodiments of the present disclosure, whether the intra prediction value of the current block is determined in a weighting manner is determined according to both the cost for performing prediction on the template region of the current block in a single prediction mode and the cost for performing prediction on the template region of the current block in at least two prediction modes. Therefore, embodiments of the present disclosure can be conducive to performing intra prediction on the current block more accurately, thereby improving compression efficiency.

There also exists an intra prediction method. In this method, when amplitude values corresponding to template regions are all 0, a prediction value obtained by performing prediction on a current block in a planar mode is determined as a final prediction result of the current block. Otherwise, the final prediction result is obtained by weighting prediction results obtained by performing prediction on the current block in a planar mode and two angular modes with the highest amplitude value and the second highest amplitude value. Compared with this solution, in embodiments of the present disclosure, whether the intra prediction value of the current block is determined in a weighting manner is determined according to both the cost for performing prediction on the template region of the current block in a single prediction mode and the cost for performing prediction on the template region of the current block in at least two prediction modes. Therefore, embodiments of the present disclosure can be conducive to performing intra prediction on the current block more accurately, thereby improving compression efficiency.

As a possible implementation, when the first cost is less than the second cost, the intra prediction value of the current block is determined according to the at least two prediction modes and the first weight combination. When the first cost is greater than or equal to the second cost, the intra prediction value of the current block is determined according to according to the first prediction mode.

Continuing the above example, after determining the first cost $cost_{blend}$ and the second cost cost1, when $cost_{blend} < cost1$, the intra prediction value of the current block is obtained by weighting, according to the first weight combination, the prediction results obtained by performing prediction on the current block in the at least two prediction modes. Exemplarily, the intra prediction value may be determined by weighting according to the above formula (3) or (4). When $cost_{blend} \geq cost1$, the prediction result obtained by performing prediction on the current block in the first prediction mode is determined as the intra prediction value of the current block.

It may be noted that, in the TIMD technology, when the cost for performing prediction on the template region of the current block in the prediction mode is calculated, the prediction value is obtained by performing prediction on the template region in the prediction mode (for example, all prediction modes in the candidate modes). Therefore, in embodiments of the present disclosure, when whether an intra prediction value of a current picture is determined in a weighting manner is determined, calculated prediction values corresponding to modes with a minimum cost and a second minimum cost may be saved to determine whether weighting is required, which can help reduce the complexity of embodiments of the present disclosure.

In the DIMD technology, mode1 and mode2 are derived from a statistical gradient histogram, and the prediction value obtained by performing prediction on the template region of the current block in mode1, mode2, or the planar mode are not calculated. Therefore, in embodiments of the present disclosure, the prediction values obtained by performing prediction on the template region of the current block in mode1, mode2, and the planar mode are required to be calculated. The prediction value of the at least two prediction modes in the template region are obtained by weighting, according to the first weight combination, the prediction values corresponding to the at least two prediction modes. Further, according to the reconstructed value of the template region, the cost for performing prediction on the template region in the at least two prediction modes can be obtained, and the cost for performing prediction on the template region in each single prediction mode can be calculated. Then, whether the intra prediction value of the current block is determined in a weighting manner may be determined.

In some optional embodiments, the intra prediction value of the current block may further be determined according to the first cost, the second cost, and a second weight of the second cost.

Specifically, since the cost for performing prediction on the template region of the current block in the prediction mode (e.g., the SATD, the SAD, or the SSE, etc.) is an estimated value and does not accurately reflect the prediction effect of the prediction mode in the template region, it may not be effective to determine whether the intra prediction value of the current block is determined in the weighting manner only according to the cost for performing prediction on the template region in the prediction mode. For example, in the case where the cost for performing prediction on the template region of the current block in the at least two prediction modes is greater than the cost for performing prediction on the template region of the current block in the single prediction mode, the intra prediction value of the current block determined in the weighting manner may achieve improvement in video compression performance, e.g., a performance gain of 0.1%, as compared to the intra prediction value determined in the non-weighting manner. Based on this, in embodiments of the present disclosure, when whether the intra prediction value of the current block is determined in the weighting manner is determined, a weight (e.g., the second weight) is introduced for the second cost, which can be conducive to performing intra prediction on the current block more accurately, thereby improving compression efficiency.

As a possible implementation, when the first cost is less than a product of the second cost and the second weight, the intra prediction value of the current block is determined according to the at least two prediction modes and the first weight combination. When the first cost is greater than or equal to the product of the second cost and the second weight, the intra prediction value of the current block is determined according to the first prediction mode.

As a specific example, after a first cost $cost_{blend}$, a second cost cost1, and a second weight w' are determined, when $cost_{blend} < cost1*w'$, the intra prediction value of the current block is obtained by weighting, according to the first weight combination, the prediction results obtained by performing prediction on the current block in the at least two prediction modes. When $cost_{blend} \geq cost1*w'$, the prediction result obtained by performing prediction on the current block in the first prediction mode is determined as the intra prediction value of the current block.

Optionally, the second weight is determined according to angles of the at least two prediction modes, and/or according to a type of the prediction mode corresponding to the minimum cost of the at least two costs for performing prediction on the template region of the current block in the at least two prediction modes. Exemplarily, the second weight may be determined according to the specific mode of the to-be-weighted mode (i.e., the at least two prediction modes), or according to the specific mode of the prediction mode corresponding to the minimum cost of the at least two costs for performing prediction on the template region of the current block in the at least two prediction modes.

In some embodiments, when the at least two prediction modes to be weighted are prediction modes with similar angles, it is more reliable to determine whether the intra prediction value of the current block is determined in the weighting manner by comparing the cost for performing prediction on the template region in the prediction mode. In some embodiments, when the at least two prediction modes to be weighted are prediction modes with significantly different angles, it is less reliable to determine whether the intra prediction value of the current block is determined in the weighting manner by comparing the cost for performing prediction on the template region in the prediction mode. In some embodiments, when one of the at least two prediction modes to be weighted is the planar mode, and a mode corresponding to the minimum cost of the costs for performing prediction on the template region in the at least two prediction modes is the angular mode, it will be more effective to determine the intra prediction value of the current block in the weighting manner.

As a possible implementation, the second weight may be determined according to a difference between angles of the at least two prediction modes to be weighted.

As a specific example, when the at least two prediction modes to be weighted are a prediction mode with an angle of 30° and a prediction mode with an angle of 31°, $cost_{blend} < cost1*w1'$ is determined as a condition for determining whether the intra prediction value of the current block is determined in the weighting manner. In other words, when $cost_{blend} < cost1*w1'$ is met, the intra prediction value of the current block is obtained by weighting, according to the first weight combination, the prediction results obtained by performing prediction on the current block in the at least two prediction modes. Otherwise, when $cost_{blend} \geq cost1*w1'$, the prediction result obtained by performing prediction on the current block in the first prediction mode is determined as the intra prediction value of the current block.

As another specific example, when the at least two prediction modes to be weighted are the prediction mode with an angle of 30° and a prediction mode with an angle of 60°, since the angles of the at least two prediction modes are significantly different, $cost_{blend} < cost1*w2'$ is determined as the condition for determining whether the intra prediction value of the current block is determined in the weighting manner. For details, reference can be made to the above descriptions, which will not be repeated herein.

As another specific example, when the two prediction modes to be weighted are the prediction mode with an angle of 30° and the planar mode, and the cost for performing prediction on the template region of the current block in the planar mode is minimum, $cost_{blend} < cost1*w3'$ is determined as the condition for determining whether the intra prediction value of the current block is determined in the weighting manner. For details, reference can be made to the above descriptions, which will not be repeated herein.

As another specific example, when the two prediction modes to be weighted are the prediction mode with an angle of 30° and the planar mode, and the cost for performing prediction on the template region of the current block in the prediction mode with an angle of 30° is minimum, $cost_{blend} < cost1*w4'$ is determined as the condition for determining whether the intra prediction value of the current block is determined in the weighting manner. For details, reference can be made to the above descriptions, which will not be repeated herein.

In some optional embodiments, the intra prediction value of the current block is determined according to the first cost, the second cost, and the third cost.

Exemplarily, the second cost is a minimum cost cost1 of the costs for performing prediction on the template region of the current block in the at least two prediction modes, and the third cost is a second minimum cost cost2 of the costs for performing prediction on the template region of the current block in the at least two prediction modes. In other words, whether the intra prediction value of the current block is determined in the weighting manner may be determined according to both the cost $cost_{blend}$ for performing prediction on the template region of the current block in the at least two prediction modes and the minimum cost cost1 and the second minimum cost cost2 of the costs for performing prediction on the template region in the at least two prediction modes.

Therefore, in embodiments of the present disclosure, the condition for determining whether the intra prediction value of the current block is determined in the weighting manner is further limited, which can be conducive to performing intra prediction on the current block more accurately, thereby improving compression efficiency.

As a possible implementation, when the first cost is less than the second cost and twice the second cost is greater than the third cost, the intra prediction value of the current block is determined according to the at least two prediction modes and the first weight combination. When the first cost is greater than or equal to the second cost or twice the second cost is less than or equal to the third cost, the intra prediction value of the current block is determined according to the first prediction mode.

As a specific example, after the first cost $cost_{blend}$, the second cost cost1, and the third cost cost2 are determined, when $cost_{blend} < cost1$ and $2*cost1 > cost2$, the intra prediction value of the current block is obtained by weighting, according to the first weight combination, the prediction results obtained by performing prediction on the current block in the at least two prediction modes. Exemplarily, the intra prediction value may be determined by weighting according to the above formula (3) or (4). When $cost_{blend} \geq cost1$ or $2*cost1 \leq cost2$, the prediction result obtained by performing prediction on the current block in the first prediction mode is determined as the intra prediction value of the current block.

As a specific implementation, the encoder may transmit information indicating a determining condition used for the current block in the bitstream. For example, the information may indicate that for the current block, a determining condition of $cost_{blend} < cost1$, a determining condition of $2*cost1 \leq cost2$, or both the determining condition of $cost_{blend} < cost1$ and the determining condition of $2*cost1 \leq cost2$ is used to determine whether the intra prediction value of the current block is determined in the weighting manner. Correspondingly, the decoder may obtain the information indicating the determining condition used for the current block from the bitstream, thereby determining the determining condition for determining whether weighting is required.

Thus, in embodiments of the present disclosure, the second minimum cost cost2 and twice the minimum cost cost1 for performing prediction on the template region in the at least two prediction modes form the condition for determining whether the intra prediction value of the current block is determined in the weighting manner, which can be conducive to performing intra prediction on the current block more accurately.

In embodiments of the present disclosure, the first cost for performing prediction on the template region of the current block in the at least two prediction modes is determined according to the at least two prediction modes and the first weight combination of the at least two prediction modes. The second cost for performing prediction on the template region of the current block in the first prediction mode is determined. The intra prediction value of the current block is then determined according to the first cost and the second cost. In embodiments of the present disclosure, the intra prediction value of the current block can be determined according to the cost for performing prediction on the template region of the current block in the at least two prediction modes and the cost for performing prediction on the template region of the current block in the first prediction mode. Therefore, embodiments of the present disclosure can be conducive to performing intra prediction on the current block more accurately, thereby improving compression efficiency.

FIG. 7 illustrates a schematic flowchart of an intra prediction method 400 provided in embodiments of the present disclosure. The method 400 may be applicable to an encoder, such as the encoder 100 in FIG. 1. Further, the method 400 may be applicable to the intra prediction unit 104 in the encoder 100. As illustrated in FIG. 7, the method 400 includes operations at 410 to 460.

At 410, at least two prediction modes are determined when an intra prediction value is determined in a derivation manner.

At 420, a first weight combination related to the at least two prediction modes is determined.

At 430, a first cost for performing prediction on a template region of a current block in the at least two prediction modes is determined according to the at least two prediction modes and the first weight combination.

At 440, a second cost for performing prediction on the template region in a first prediction mode is determined according to the first prediction mode.

At 450, an intra prediction value of the current block is determined according to the first cost and the second cost.

At 460, a prediction mode parameter is signalled in a bitstream, where the prediction mode parameter indicates that the intra prediction value is to be determined in the derivation manner.

In some optional embodiments, the intra prediction value of the current block is determined according to the first cost and the second cost as follows. When the first cost is less than the second cost, the intra prediction value of the current block is determined according to the at least two prediction modes and the first weight combination, where the intra prediction value of the current block is obtained by weighting, according to the first weight combination, prediction values obtained by performing prediction on the current block in the at least two prediction modes.

In some optional embodiments, the intra prediction value of the current block is determined according to the first cost and the second cost as follows. When the first cost is greater than or equal to the second cost, the intra prediction value of the current block is determined according to the first prediction mode.

In some optional embodiments, the first prediction mode includes a prediction mode corresponding to a minimum cost of at least two costs for performing prediction on the template region in the at least two prediction modes.

In some optional embodiments, the first cost for performing prediction on the template region of the current block in the at least two prediction modes is determined according to the at least two prediction modes and the first weight combination as follows. At least two first prediction values are obtained by performing prediction on the template region in the at least two prediction modes. A weighted result is obtained by weighting, according to the first weight combination, the at least two first prediction values. The first cost is determined according to the weighted result and a reconstructed value of the template region.

In some optional embodiments, the second cost for performing prediction on the template region in the first prediction mode is determined according to the first prediction mode as follows. A second prediction value is obtained by performing prediction on the template region in the first prediction mode. The second cost is determined according to the second prediction value and the reconstructed value of the template region.

In some optional embodiments, the first weight combination related to the at least two prediction modes is determined as follows. The at least two costs for performing prediction on the template region of the current block in the at least two prediction modes are determined according to at least two weight combinations in a predefined weight combination table. A weight combination corresponding to a minimum cost of the at least two costs corresponding to the at least two weight combinations is determined as the first weight combination.

In some optional embodiments, a third cost for performing prediction on the template region in a second prediction mode is determined according to the second prediction mode. The intra prediction value of the current block is determined according to the first cost and the second cost as follows. The intra prediction value of the current block is determined according to the first cost, the second cost, and the third cost.

In some optional embodiments, the intra prediction value of the current block is determined according to the first cost, the second cost, and the third cost as follows. When the first cost is less than the second cost and twice the second cost is greater than the third cost, the intra prediction value of the current block is determined according to the at least two prediction modes and the first weight combination. When the first cost is greater than or equal to the second cost or twice the second cost is less than or equal to the third cost, the intra prediction value of the current block is determined according to the first prediction mode.

In some optional embodiments, the second prediction mode is a prediction mode corresponding to a second minimum cost of the at least two costs for performing prediction on the template region in the at least two prediction modes.

In some optional embodiments, the intra prediction value of the current block is determined according to the first cost and the second cost as follows. The intra prediction value of the current block is determined according to the first cost, the second cost, and a second weight of the second cost.

In some optional embodiments, the intra prediction value of the current block is determined according to the first cost, the second cost, and the second weight of the second cost as follows. When the first cost is less than a product of the second cost and the second weight, the intra prediction value of the current block is determined according to the at least two prediction modes and the first weight combination. When the first cost is greater than or equal to the product of the second cost and the second weight, the intra prediction value of the current block is determined according to the first prediction mode.

In some optional embodiments, the second weight is determined according to angles of the at least two prediction modes, and/or according to a type of the prediction mode corresponding to the minimum cost of the at least two costs for performing prediction on the template region of the current block in the at least two prediction modes.

In some optional embodiments, the at least two prediction modes are determined when the intra prediction value is determined in the derivation manner as follows. When the derivation manner is TIMD, the at least two prediction modes are determined according to the cost for performing prediction on the template region in the prediction mode.

In some optional embodiments, the at least two prediction modes are determined when the intra prediction value is determined in the derivation manner as follows. When the derivation manner is DIMD, the at least two prediction modes are determined according to an amplitude value corresponding to the prediction mode on the template region, where the amplitude value is obtained according to a sample gradient at at least one position in at least one direction in the template region.

In some optional embodiments, the current block includes a CU or a PU.

In some optional embodiments, the template region of the current block includes at least part of samples in at least one row of samples at the top, the left, the top left, the bottom left, and the top right of the current block.

It may be noted that, in embodiments of the present disclosure, when the intra prediction method is applicable to the encoder, specific operations may be referred to the operations of the intra prediction method applicable to the decoder, which will not be repeated herein. With the intra prediction method provided in embodiments of the present disclosure, a better prediction effect at the encoder 100 can be achieved and the encoding performance can be improved, and accordingly, the video decoding recovery quality at the decoder 200 can be improved, thereby improving the decoding performance. Specifically, when the encoder encodes or tries to encode the TIMD and the decoder decodes the TIMD, in the encoding process and the decoding process, the intra prediction value of the current block may be calculated with the same predefined rules or operations.

The specific implementations of the present disclosure have been described in detail above in conjunction with the accompanying drawings. However, the present disclosure is not limited to the specific details in the above implementations. Within the scope of the technical concept of the present disclosure, various simple modifications may be made to the technical solutions of the present disclosure. These simple modifications all belong to the protection scope of the present disclosure. For example, the various specific technical features described in the above specific implementations can be combined in any suitable manner if there is no contradiction. As another example, any combination of various implementations of the present disclosure can also be made, as long as they do not violate the idea of the present disclosure, which may also be regarded as the content disclosed in the present disclosure.

It may also be understood that in the various method embodiments of the present disclosure, the sequence numbers of the above-mentioned processes do not mean the order of execution, and the order of execution of the processes may be determined according to their functions and internal logic, and may not form any limit to an implementation process of the embodiments of the disclosure. It may be understood that these sequence numbers may be interchanged when appropriate, so that the described embodiments of the present disclosure can be implemented in an order other than those illustrated or described in the drawings.

The method embodiments in the present disclosure are described in detail above with reference to FIG. 1 to FIG. 7. In the following, apparatus embodiments of the present disclosure will be described in detail with reference to FIG. 8 to FIG. 10.

Figure 8:
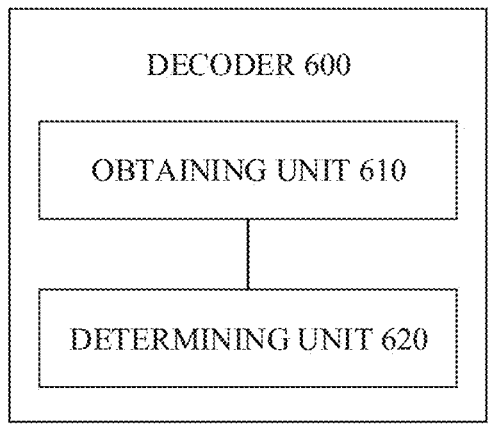
FIG. 8 is a schematic block diagram of a decoder provided in embodiments of the present disclosure.

FIG. 8 is a schematic block diagram of a decoder 600 of embodiments of the present disclosure. The device 600 is, for example, the decoder 200 in FIG. 2. As illustrated in FIG. 8, the device 600 may include an obtaining unit 610 and a determining unit 620. The obtaining unit 610 is configured to obtain a prediction mode parameter, where the prediction mode parameter indicates that an intra prediction value is to be determined in a derivation manner. The determining unit 620 is configured to determine at least two prediction modes according to the derivation manner. The determining unit 620 is further configured to determine a first weight combination related to the at least two prediction modes. The determining unit 620 is further configured to determine, according to the at least two prediction modes and the first weight combination, a first cost for performing prediction on a template region of a current block in the at least two prediction modes. The determining unit 620 is further configured to determine, according to a first prediction mode, a second cost for performing prediction on the template region in the first prediction mode. The determining unit 620 is further configured to determine an intra prediction value of the current block according to the first cost and the second cost.

In some optional embodiments, the determining unit 620 is specifically configured to determine the intra prediction value of the current block according to the at least two prediction modes and the first weight combination when the first cost is less than the second cost, where the intra prediction value of the current block is obtained by weighting, according to the first weight combination, prediction values obtained by performing prediction on the current block in the at least two prediction modes.

In some optional embodiments, the determining unit 620 is specifically configured to determine the intra prediction value of the current block according to the first prediction mode when the first cost is greater than or equal to the second cost.

In some optional embodiments, the first prediction mode includes a prediction mode corresponding to a minimum cost of at least two costs for performing prediction on the template region in the at least two prediction modes.

In some optional embodiments, the determining unit 620 is specifically configured to obtain at least two first prediction values by performing prediction on the template region in the at least two prediction modes, obtain a weighted result by weighting, according to the first weight combination, the at least two first prediction values, and determine the first cost according to the weighted result and a reconstructed value of the template region.

In some optional embodiments, the determining unit 620 is specifically configured to obtain a second prediction value by performing prediction on the template region in the first prediction mode, and determine the second cost according to the second prediction value and a reconstructed value of the template region.

In some optional embodiments, the determining unit 620 is specifically configured to determine, according to at least two weight combinations in a predefined weight combination table, the at least two costs for performing prediction on the template region of the current block in the at least two prediction modes, and determine a weight combination corresponding to a minimum cost of the at least two costs corresponding to the at least two weight combinations as the first weight combination.

In some optional embodiments, the determining unit 620 is further configured to determine, according to a second prediction mode, a third cost for performing prediction on the template region in the second prediction mode, and determine the intra prediction value of the current block according to the first cost, the second cost, and the third cost.

In some optional embodiments, the determining unit 620 is specifically configured to determine the intra prediction value of the current block according to the at least two prediction modes and the first weight combination when the first cost is less than the second cost and twice the second cost is greater than the third cost, and determine the intra prediction value of the current block according to the first prediction mode when the first cost is greater than or equal to the second cost or twice the second cost is less than or equal to the third cost.

In some optional embodiments, the second prediction mode is a prediction mode corresponding to a second minimum cost of the at least two costs for performing prediction on the template region in the at least two prediction modes.

In some optional embodiments, the determining unit 620 is specifically configured to determine the intra prediction value of the current block according to the first cost, the second cost, and a second weight of the second cost.

In some optional embodiments, the determining unit 620 is specifically configured to determine the intra prediction value of the current block according to the at least two prediction modes and the first weight combination when the first cost is less than a product of the second cost and the second weight, and determine the intra prediction value of the current block according to the first prediction mode when the first cost is greater than or equal to the product of the second cost and the second weight.

In some optional embodiments, the second weight is determined according to angles of the at least two prediction modes, and/or according to a type of the prediction mode corresponding to the minimum cost of the at least two costs for performing prediction on the template region of the current block in the at least two prediction modes.

In some optional embodiments, the determining unit 620 is specifically configured to determine the at least two prediction modes according to the cost for performing prediction on the template region in the prediction mode when the derivation manner is TIMD.

In some optional embodiments, the determining unit 620 is specifically configured to determine the at least two prediction modes according to an amplitude value corresponding to the prediction mode on the template region when the derivation manner is DIMD, where the amplitude value is obtained according to a sample gradient at at least one position in at least one direction in the template region.

In some optional embodiments, the current block includes a CU or a PU.

In some optional embodiments, the template region of the current block includes at least part of samples in at least one row of samples at the top, the left, the top left, the bottom left, and the top right of the current block.

It may be understood that the apparatus embodiments and the method embodiments may correspond to each other, and similar descriptions may refer to the method embodiments. To avoid repetition, details are not repeated here. Specifically, the device 600 for intra prediction in embodiments may correspond to a corresponding subject for performing the method 300 of the embodiments of the present disclosure, and the aforementioned and other operations and/or functions of each module in the device 600 for intra prediction are configured to implement corresponding processes in each method in FIG. 6. For the sake of brevity, the corresponding processes are not repeated herein.

Figure 9:
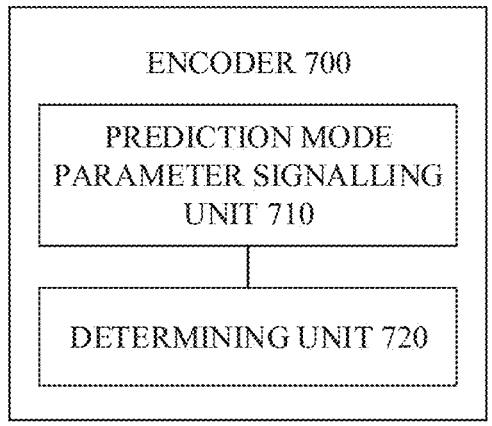
FIG. 9 is a schematic block diagram of an encoder provided in embodiments of the present disclosure.

FIG. 9 is a schematic block diagram of an encoder 700 of embodiments of the present disclosure. The device 700 is, for example, the encoder 100 in FIG. 1. As illustrated in FIG. 9, the device 700 may include a prediction mode parameter signalling unit 710 and a determining unit 720. The determining unit 720 is configured to determine at least two prediction modes when an intra prediction value is determined in a derivation manner. The determining unit 720 is further configured to determine a first weight combination related to the at least two prediction modes. The determining unit 720 is further configured to determine, according to the at least two prediction modes and the first weight combination, a first cost for performing prediction on a template region of a current block in the at least two prediction modes. The determining unit 720 is further configured to determine, according to a first prediction mode, a second cost for performing prediction on the template region in the first prediction mode. The determining unit 720 is further configured to determine an intra prediction value of the current block according to the first cost and the second cost. The prediction mode parameter signalling unit 710 is configured to signal a prediction mode parameter in a bitstream, where the prediction mode parameter indicates that the intra prediction value is to be determined in the derivation manner.

In some optional embodiments, the determining unit 720 is specifically configured to determine the intra prediction value of the current block according to the at least two prediction modes and the first weight combination when the first cost is less than the second cost, where the intra prediction value of the current block is obtained by weighting, according to the first weight combination, prediction values obtained by performing prediction on the current block in the at least two prediction modes.

In some optional embodiments, the determining unit 720 is specifically configured to determine the intra prediction value of the current block according to the first prediction mode when the first cost is greater than or equal to the second cost.

In some optional embodiments, the first prediction mode includes a prediction mode corresponding to a minimum cost of at least two costs for performing prediction on the template region in the at least two prediction modes.

In some optional embodiments, the determining unit 720 is specifically configured to obtain at least two first prediction values by performing prediction on the template region in the at least two prediction modes, obtain a weighted result by weighting, according to the first weight combination, the at least two first prediction values, and determine the first cost according to the weighted result and a reconstructed value of the template region.

In some optional embodiments, the determining unit 720 is specifically configured to obtain a second prediction value by performing prediction on the template region in the first prediction mode, and determine the second cost according to the second prediction value and a reconstructed value of the template region.

In some optional embodiments, the determining unit 720 is specifically configured to determine, according to at least two weight combinations in a predefined weight combination table, the at least two costs for performing prediction on the template region of the current block in the at least two prediction modes, and determine a weight combination corresponding to a minimum cost of the at least two costs corresponding to the at least two weight combinations as the first weight combination.

In some optional embodiments, the determining unit 720 is further configured to determine, according to a second prediction mode, a third cost for performing prediction on the template region in the second prediction mode, and determine the intra prediction value of the current block according to the first cost, the second cost, and the third cost.

In some optional embodiments, the determining unit 720 is specifically configured to determine the intra prediction value of the current block according to the at least two prediction modes and the first weight combination when the first cost is less than the second cost and twice the second cost is greater than the third cost, and determine the intra prediction value of the current block according to the first prediction mode when the first cost is greater than or equal to the second cost or twice the second cost is less than or equal to the third cost.

In some optional embodiments, the second prediction mode is a prediction mode corresponding to a second minimum cost of the at least two costs for performing prediction on the template region in the at least two prediction modes.

In some optional embodiments, the determining unit 720 is specifically configured to determine the intra prediction value of the current block according to the first cost, the second cost, and a second weight of the second cost.

In some optional embodiments, the determining unit 720 is specifically configured to determine the intra prediction value of the current block according to the at least two prediction modes and the first weight combination when the first cost is less than a product of the second cost and the second weight, and determine the intra prediction value of the current block according to the first prediction mode when the first cost is greater than or equal to the product of the second cost and the second weight.

In some optional embodiments, the second weight is determined according to angles of the at least two prediction modes, and/or according to a type of the prediction mode corresponding to the minimum cost of the at least two costs for performing prediction on the template region of the current block in the at least two prediction modes.

In some optional embodiments, the determining unit 720 is specifically configured to determine the at least two prediction modes according to the cost for performing prediction on the template region in the prediction mode when the derivation manner is TIMD.

In some optional embodiments, the determining unit 720 is specifically configured to determine the at least two prediction modes according to an amplitude value corresponding to the prediction mode on the template region when the derivation manner is DIMD, where the amplitude value is obtained according to a sample gradient at at least one position in at least one direction in the template region.

In some optional embodiments, the current block includes a CU or a PU.

In some optional embodiments, the template region of the current block includes at least part of samples in at least one row of samples at the top, the left, the top left, the bottom left, and the top right of the current block.

It may be understood that the apparatus embodiments and the method embodiments may correspond to each other, and similar descriptions may refer to the method embodiments. To avoid repetition, details are not repeated here. Specifically, the device 700 for intra prediction in embodiments may correspond to a corresponding subject for performing the method 400 of the embodiments of the present disclosure, and the aforementioned and other operations and/or functions of each module in the device 700 for intra prediction are configured to implement corresponding processes in each method in FIG. 7. For the sake of brevity, the corresponding processes are not repeated herein.

The apparatus and system of the embodiments of the present disclosure are described above from the perspective of functional units with reference to the accompanying drawings. It may be understood that the functional units may be implemented in the form of hardware, may also be implemented by instructions in the form of software, and may also be implemented by a combination of hardware and software units. Specifically, each operation of the method embodiments in the disclosure can be completed by an integrated logic circuit of the hardware in the processor and/or instructions in the form of software, and the operations of the method disclosed in embodiments of the disclosure can be directly executed by a hardware coding processor or a combination of hardware and software units in the decoding processor. Optionally, the software unit may be located in a mature storage medium in the field such as random-access memory, flash memory, read-only memory, programmable read-only memory, electrically erasable programmable memory, and registers. The storage medium is located in the memory, and the processor reads the information from the memory, and completes the operations in the above method embodiments in combination with its hardware.

Figure 10:
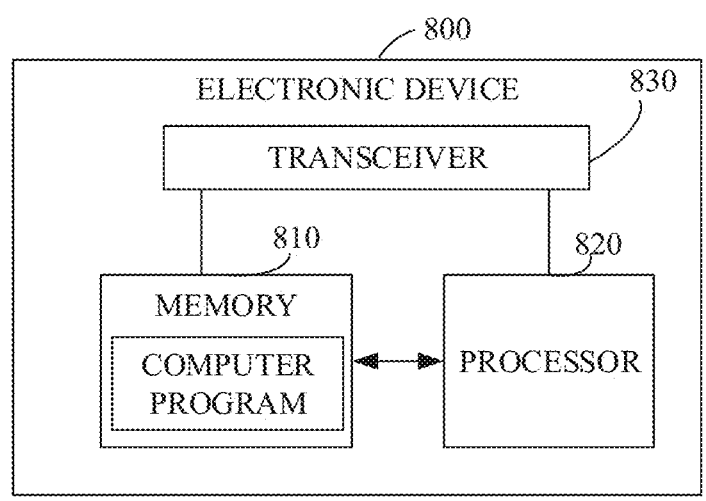
FIG. 10 is a schematic block diagram of an electronic device provided in embodiments of the present disclosure.

FIG. 10 is a schematic block diagram of an electronic device 800 provided in embodiments of the present disclosure.

As illustrated in FIG. 10, the electronic device 800 may include a memory 810 and a processor 820. The memory 810 is configured to store computer programs and transmit program codes to the processor 820. In other words, the processor 820 can invoke and execute the computer programs from the memory 810 to implement the method in embodiments of the present disclosure.

For example, the processor 820 can be configured to execute the operations in the method 300 or the method 400 according to instructions in the computer programs.

In some embodiments of the present disclosure, the processor 820 may include but is not limited to a general-purpose processor, a digital signal processor (DSP), an application-specific integrated circuit (ASIC), a field programmable gate array (FPGA) or other programmable logic devices, a discrete gate or a transistor logic device, a discrete hardware component, and so on.

In some embodiments of the present disclosure, the memory 810 includes but is not limited to a volatile memory and/or a non-volatile memory. The non-volatile memory can be a read-only memory (ROM), a programmable read-only memory (PROM), an erasable PROM (EPROM), an electrically EPROM (EEPROM), or a flash. The volatile memory may be a random-access memory (RAM), which acts as an external cache. By way of illustration and not limitation, many forms of RAM are available such as static RAM (SRAM), dynamic RAM (DRAM), synchronous DRAM (SDRAM), a double data rate SDRAM (DDR SDRAM), an enhanced SDRAM (ESDRAM), a synchronous link DRAM (SLDRAM), and a direct rambus RAM (DR RAM).

In some embodiments of the present disclosure, the computer program can be divided into one or more units, and the one or more units are stored in the memory 810 and executed by the processor 820 to complete the methods in the present disclosure. The one or more units may be a series of computer program instruction segments capable of accomplishing specific functions, and the instruction segments are used to describe the execution process of the computer program in the electronic device 800.

As illustrated in FIG. 10, the electronic device 800 may also include a transceiver 830, where the transceiver 830 may be connected to the processor 820 or the memory 810.

The processor 820 can control the transceiver 830 to communicate with other devices, specifically, to send information or data to other devices, or receive information or data sent by other devices. The transceiver 830 may include a transmitter and a receiver. The transceiver 830 may further include antennas, and the number of antennas may be one or more.

It may be understood that the various components in the electronic device 800 are connected through a bus system, where the bus system includes not only a data bus, but also a power bus, a control bus, and a status signal bus.

According to an aspect of the present disclosure, an encoding device or decoding device is provided. The encoding device or decoding device includes a processor and a memory. The memory is configured to store computer programs. The processor is configured to invoke and execute the computer programs stored in the memory to cause the encoder to perform the method of the above method embodiments.

According to an aspect of the present disclosure, a coding system is provided. The coding system includes an encoding device (or encoder) and a decoding device (or decoder) as described above.

According to an aspect of the present disclosure, a computer storage medium is provided. The computer storage medium stores computer programs which, when executed by a computer, cause the computer to execute the methods of the above method embodiments. In other words, the embodiments of the present disclosure further provide a computer program product including instructions which, when executed by the computer, cause the computer to execute the methods of the above method embodiments.

According to another aspect of the present disclosure, a computer program product or a computer program is provided. The computer program product or the computer program includes computer instructions stored in a computer-readable storage medium. A processor of a computer device is configured to read and execute the computer instructions from the computer-readable storage medium, to cause the computer device to perform the methods of the above method embodiments.

In other words, when implemented using software, the disclosure may be implemented in whole or in part in the form of the computer program product. The computer program product includes one or more computer instructions. When the computer program instructions are loaded and executed on the computer, the processes or functions according to the embodiments of the present disclosure will be generated in whole or in part. The computer can be a general-purpose computer, a special-purpose computer, a computer network, or other programmable device. The computer instructions may be stored in or transmitted from one computer-readable storage medium to another computer-readable storage medium, for example, the computer instructions may be transferred from a website, a computer, a server, or a data center by wire (such as a coaxial cable, an optical fiber, a digital subscriber line (DSL)) or wireless (such as infrared, wireless, microwave, etc.) to another website site, computer, server, or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a digital video disc (DVD)), or a semiconductor medium (such as a solid-state disk (SSD)), etc.

It may be understood that, in embodiments of the present disclosure, "B corresponding to A" indicates that B is associated with A. In an implementation, B may be determined according to A. It may be further understood that, "determine B according to A" does not mean that B is determined according to A only, and B may also be determined according to A and/or other information.

In descriptions of the present disclosure, unless otherwise stated, "at least one" refers to one or more, and "a plurality of" or "multiple" refers to two or more. In addition, "and/or" describes an association relationship between associated objects, which means that there may be three relationships. For example, A and/or B can mean A alone, both A and B exist, and B alone, where A and B each may be singular or plural. The character "/" herein generally indicates that the associated objects are in an "or" relationship. "At least one (item) of the following" as well as similar expressions thereof refers to any combination of these items, including any combination of a singular item (one) or a plural item (one). For example, at least one (item) of a, b, or c may mean: a, b, c, a-b, a-c, b-c, or a-b-c, where a, b, and c each may be one or multiple.

It may also be understood that the "first", "second", and other descriptions appearing in embodiments of the present disclosure are only used for illustrating and distinguishing between objects described, and do not indicate any order. These descriptions also do not indicate a particular limitation on the number of devices in embodiments of the present disclosure, and cannot constitute any limitation on embodiments of the present disclosure.

It may also be understood that particular features, structures, or characteristics related to the embodiments in the specification are included in at least one embodiment of the present disclosure. Furthermore, the particular features, structures, or characteristics may be combined in one or more embodiments in any suitable manner.

In addition, the terms "include", "comprise", and "have" as well as variations thereof are intended to cover non-exclusive inclusion. For example, a process, method, system, product, or server including a series of steps or units is not limited to the listed steps or units, and instead, it can optionally include other steps or units that are not listed or other steps or units inherent to the process, method, product, or device.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific disclosure and design constraints of the technical solution. Those skilled in the art may use different methods to implement the described functions for each specific disclosure, but such implementation should not be regarded as exceeding the scope of the present disclosure.

In the several embodiments provided in this disclosure, it should be understood that the disclosed systems, apparatuses, and methods may be implemented in other ways. For example, the apparatus embodiments described above are only illustrative. For example, the division of the units is only a logical function division. In an actual implementation, there may be other division methods. For example, multiple units or components can be combined or can be integrated into another system, or some features may be ignored, or not implemented. On another point, the mutual coupling or direct coupling or communication connection illustrated or discussed may be through some interfaces, and the indirect coupling or communication connection of devices or units may be in electrical, mechanical or other forms.

A unit described as a separate component may or may not be physically separated, and a component displayed as a unit may or may not be a physical unit, that is, it may be located in one place, or may be distributed to multiple network units. Part or all of the units can be selected according to actual needs to achieve the purpose of the solution of embodiments. For example, each functional unit in each embodiment of the present disclosure may be integrated into one processing unit, each unit may exist separately physically, or two or more units may be integrated into one unit.

The above is only a specific implementation of the disclosure, but the scope of protection of the disclosure is not limited thereto. Those skilled in the art can easily think of changes or substitutions within the technical scope disclosed in the disclosure, which should be covered within the scope of protection of this disclosure. Therefore, the protection scope of the present disclosure should be based on the protection scope of the claims.

What is claimed is:

1. An intra prediction method, applicable to a decoder and comprising:
   obtaining a prediction mode parameter, wherein the prediction mode parameter indicates that an intra prediction value is to be determined in a derivation manner;
   determining at least two intra prediction modes according to the derivation manner;
   determining a first weight combination related to the at least two intra prediction modes;
   determining a first cost according to the at least two intra prediction modes and the first weight combination, wherein the first cost is for performing intra prediction on a template region of a current block in the at least two intra prediction modes;
   determining a second cost according to a first intra prediction mode, wherein the second cost is for performing intra prediction on the template region in the first intra prediction mode; and
   determining an intra prediction value of the current block according to the first cost and the second cost;
   wherein the first intra prediction mode is one of the at least two intra prediction modes or different from the at least two intra prediction modes.

2. The method of claim 1, wherein determining the intra prediction value of the current block according to the first cost and the second cost comprises:
   determining the intra prediction value of the current block according to the at least two intra prediction modes and the first weight combination when the first cost is less than the second cost, wherein the intra prediction value of the current block is obtained by weighting, according to the first weight combination, prediction values obtained by performing intra prediction on the current block in the at least two intra prediction modes.

3. The method of claim 1, wherein determining the intra prediction value of the current block according to the first cost and the second cost comprises:
   determining the intra prediction value of the current block according to the first intra prediction mode when the first cost is greater than or equal to the second cost.

4. The method of claim 1, wherein determining, according to the at least two intra prediction modes and the first weight combination, the first cost for performing intra prediction on the template region of the current block in the at least two intra prediction modes comprises:
   obtaining at least two first prediction values by performing intra prediction on the template region in the at least two intra prediction modes;
   obtaining a weighted result by weighting, according to the first weight combination, the at least two first prediction values; and
   determining the first cost according to the weighted result and a reconstructed value of the template region.

5. The method of claim 1, wherein determining, according to the first intra prediction mode, the second cost for performing intra prediction on the template region in the first intra prediction mode comprises:
   obtaining a second prediction value by performing intra prediction on the template region in the first intra prediction mode; and
   determining the second cost according to the second prediction value and a reconstructed value of the template region.

6. The method of claim 1, wherein determining the at least two intra prediction modes according to the derivation manner comprises:
   determining the at least two intra prediction modes according to a cost for performing intra prediction on the template region in a intra prediction mode when the derivation manner is template-based intra mode derivation (TIMD).

7. The method of claim 1, wherein determining the at least two intra prediction modes according to the derivation manner comprises:
   determining the at least two intra prediction modes according to an amplitude value corresponding to a intra prediction mode on the template region when the derivation manner is decoder-side intra mode derivation (DIMD), wherein the amplitude value is obtained according to a sample gradient at at least one position in at least one direction in the template region.

8. The method of claim 1, wherein the template region of the current block comprises at least part of samples in at least one row of samples at a top, a left, a top left, a bottom left, and a top right of the current block.

9. An intra prediction method, applicable to an encoder and comprising:
   determining at least two intra prediction modes when an intra prediction value is determined in a derivation manner;
   determining a first weight combination related to the at least two intra prediction modes;
   determining a first cost according to the at least two intra prediction modes and the first weight combination, wherein the first cost is for performing intra prediction on a template region of a current block in the at least two intra prediction modes;

determining a second cost according to a first intra prediction mode, wherein the second cost is for performing intra prediction on the template region in the first intra prediction mode;

determining an intra prediction value of the current block according to the first cost and the second cost; and signalling a prediction mode parameter in a bitstream, wherein the prediction mode parameter indicates that the intra prediction value is to be determined in the derivation manner;

wherein the first intra prediction mode is one of the at least two intra prediction modes or different from the at least two intra prediction modes.

10. The method of claim 9, wherein determining the intra prediction value of the current block according to the first cost and the second cost comprises:

determining the intra prediction value of the current block according to the at least two intra prediction modes and the first weight combination when the first cost is less than the second cost, wherein the intra prediction value of the current block is obtained by weighting, according to the first weight combination, prediction values obtained by performing intra prediction on the current block in the at least two intra prediction modes.

11. The method of claim 9, wherein determining the intra prediction value of the current block according to the first cost and the second cost comprises:

determining the intra prediction value of the current block according to the first intra prediction mode when the first cost is greater than or equal to the second cost.

12. The method of claim 9, wherein determining, according to the at least two intra prediction modes and the first weight combination, the first cost for performing intra prediction on the template region of the current block in the at least two intra prediction modes comprises:

obtaining at least two first prediction values by performing intra prediction on the template region in the at least two intra prediction modes;

obtaining a weighted result by weighting, according to the first weight combination, the at least two first prediction values; and determining the first cost according to the weighted result and a reconstructed value of the template region.

13. The method of claim 9, wherein determining, according to the first intra prediction mode, the second cost for performing intra prediction on the template region in the first intra prediction mode comprises:

obtaining a second prediction value by performing intra prediction on the template region in the first intra prediction mode; and determining the second cost according to the second prediction value and a reconstructed value of the template region.

14. The method of claim 9, wherein determining the at least two intra prediction modes when the intra prediction value is determined in the derivation manner comprises:

determining the at least two intra prediction modes according to a cost for performing intra prediction on the template region in a intra prediction mode when the derivation manner is template-based intra mode derivation (TIMD).

15. The method of claim 9, wherein determining the at least two intra prediction modes when the intra prediction value is determined in the derivation manner comprises:

determining the at least two intra prediction modes according to an amplitude value corresponding to a intra prediction mode on the template region when the derivation manner is decoder-side intra mode derivation (DIMD), wherein the amplitude value is obtained according to a sample gradient at at least one position in at least one direction in the template region.

16. The method of claim 9, wherein the template region of the current block comprises at least part of samples in at least one row of samples at a top, a left, a top left, a bottom left, and a top right of the current block.

17. A decoder, comprising:

a memory configured to store computer programs; and a processor configured to execute the computer programs stored in the memory to:

obtain a prediction mode parameter, wherein the prediction mode parameter indicates that an intra prediction value is to be determined in a derivation manner;

determine at least two intra prediction modes according to the derivation manner;

determine a first weight combination related to the at least two intra prediction modes;

determine a first cost according to the at least two intra prediction modes and the first weight combination, wherein the first cost is for performing intra prediction on a template region of a current block in the at least two intra prediction modes;

determine a second cost according to a first intra prediction mode, wherein the second cost is for performing intra prediction on the template region in the first intra prediction mode; and determine an intra prediction value of the current block according to the first cost and the second cost;

wherein the first intra prediction mode is one of the at least two intra prediction modes or different from the at least two intra prediction modes.

18. The decoder of claim 17, wherein the processor is specifically configured to:

determine the intra prediction value of the current block according to the at least two intra prediction modes and the first weight combination when the first cost is less than the second cost, wherein the intra prediction value of the current block is obtained by weighting, according to the first weight combination, prediction values obtained by performing intra prediction on the current block in the at least two intra prediction modes.

19. The decoder of claim 17, wherein the processor is specifically configured to:

determine the intra prediction value of the current block according to the first intra prediction mode when the first cost is greater than or equal to the second cost.

20. The decoder of claim 17, wherein the processor is specifically configured to:

obtain at least two first prediction values by performing intra prediction on the template region in the at least two intra prediction modes;

obtain a weighted result by weighting, according to the first weight combination, the at least two first prediction values; and determine the first cost according to the weighted result and a reconstructed value of the template region.

* * * * *